(12) United States Patent
Weis

(10) Patent No.: US 7,111,820 B2
(45) Date of Patent: Sep. 26, 2006

(54) INLINE CONNECTOR FOR A PLUMBING CONDUIT

(75) Inventor: Bryan Walter Weis, Milwaukie, OR (US)

(73) Assignee: JBS, Inc., Stayton, OR (US)

( * ) Notice: Subject to any disclaimer, the term of this patent is extended or adjusted under 35 U.S.C. 154(b) by 0 days.

(21) Appl. No.: 10/938,180

(22) Filed: Sep. 10, 2004

(65) Prior Publication Data

US 2006/0054853 A1    Mar. 16, 2006

(51) Int. Cl.
*F16K 51/00* (2006.01)
*F16L 29/00* (2006.01)
*F16L 37/28* (2006.01)

(52) U.S. Cl. .................................. 251/149.6

(58) Field of Classification Search ............. 251/149.5, 251/149.6, 149.7
See application file for complete search history.

(56) References Cited

U.S. PATENT DOCUMENTS

| | | | |
|---|---|---|---|
| 3,918,679 A * | 11/1975 | Silvana | 251/149.1 |
| 5,423,515 A * | 6/1995 | Ozaki | 251/149.6 |
| 5,624,073 A | 4/1997 | Mueller et al. | |
| 6,394,132 B1 * | 5/2002 | Walcome | 137/614.2 |

* cited by examiner

*Primary Examiner*—Edward K. Look
*Assistant Examiner*—John K. Fristoe, Jr.
(74) *Attorney, Agent, or Firm*—Schwabe Williamson & Wyatt

(57) ABSTRACT

An apparatus, method, and system for an inline connector for coupling/uncoupling regulators to a plumbing conduit is disclosed herein.

23 Claims, 3 Drawing Sheets

(a)

(b)

INLINE CONNECTOR FOR A PLUMBING CONDUIT

FIELD

Disclosed embodiments of the present invention relate to the field of plumbing systems, and more particularly to providing a plumbing conduit with an inline connector for interchanging modular flow regulators.

BACKGROUND

Plumbing conduits are often fit with nozzles in order to provide a discharge flow with a particular set of flow characteristics. For example, a shower head nozzle may be attached to a shower pipe fixture in order to provide a diffuse spray for bathing. These nozzles are often permanently, or at least semipermanently, affixed to their corresponding fixture. However, there may be many situations where it is desirable to provide adaptability to the flow characteristics of a particular fixture.

Prior art devices have attempted to address these situations by providing nozzles with adjustable flow characteristics, e.g., a shower head that has different selection settings. However, this does not account for other functions that may be provided from the fixture. Additionally, having one shower head with adjustable flow characteristics does not ensure the flexibility to accommodate all preferences.

Other prior art devices attempt to provide dual functionality by providing a nozzle fixture having both a shower head and a connector for other functional attachments. Not only does this prove to be a bulky and unsightly extension of the fixture it also sacrifices the flexibility of the shower head flow's characteristics.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

A method, apparatus, and system for an inline connector for a plumbing conduit is disclosed herein.

In the following detailed description, reference is made to the accompanying drawings that form a part hereof, wherein like numerals designate like parts throughout. The drawings may show, by way of illustration, specific embodiments in which the invention may be practiced. It is to be understood that other embodiments may be utilized and structural or logical changes may be made without departing from the scope of the embodiments of the present invention. It should also be noted that directions and/or references (e.g., up, down, top, and bottom) may be used in the discussion of the drawings. These are used to facilitate the discussion of the drawings and are not intended to restrict the application of the embodiments of this invention. Therefore, the following detailed description is not to be taken in a limiting sense and the scope of the embodiments of the present invention are defined by the appended claims and their equivalents.

Figure 1:
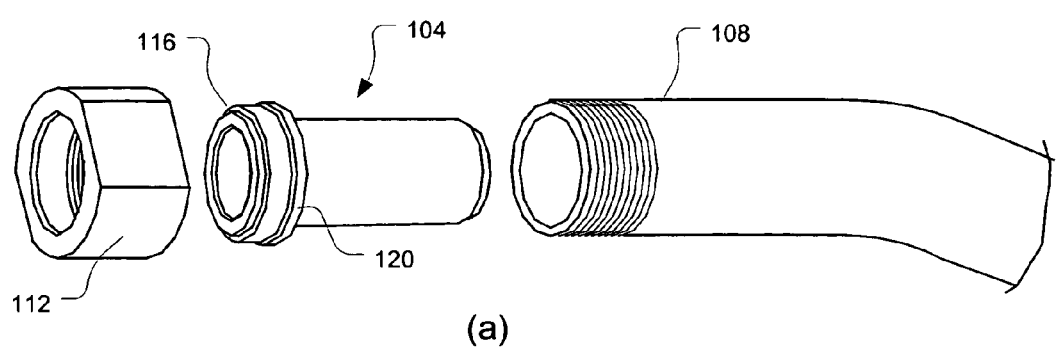
FIGS. 1(a)–(b) illustrate an exploded and assembled perspective view of a connection system, in accordance with an embodiment of the present invention.
Figure 1:
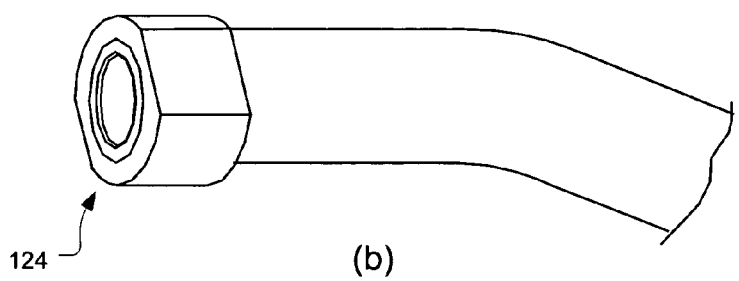

FIGS. 1(a)–(b) illustrate an exploded and assembled perspective view of a nozzle connection system 100 in accordance with an embodiment of the present invention. More specifically, a connector 104 may be at least partially inserted into a plumbing conduit 108 and secured by a nut 112. The connection system 100 may allow for a variety of flow regulators to be quickly coupled/uncoupled to/from the plumbing conduit 108. In various embodiments the plumbing conduit 108 may be an interior plumbing conduit such as, but not limited to, an interior pipe, a shower pipe fixture, and a faucet. In various embodiments the connector 104 may be mated with a variety of plumbing conduits such as external plumbing conduits or flexible plumbing conduits, e.g., a garden hose.

In one embodiment, the connector 104 may include a flange 116 to facilitate the securement of the connector 104 to the plumbing conduit 108. A washer 120 may be seated between the flange 116 and the outer rim of the plumbing conduit 108 to assist in developing a watertight seal between the plumbing conduit 108 and the connector 104. The nut 112 may be coupled to the plumbing conduit 108 with the connector 104, and more particularly the flange 116 and the washer 120, disposed securely therebetween. In one embodiment the connector 104 may include a shouldered edge to complement the nut 112 in order to provide a flush face 124 when the connection system 100 is assembled.

The connection system 100 of this embodiment may provide low-profile inline adaptability for the plumbing conduit 108. This adaptability may allow for quick and convenient interchangeability between a variety of flow regulators, e.g., nozzles. Each nozzle may be capable of providing unique flow characteristics and functionalities for the plumbing conduit 108.

Figure 2:
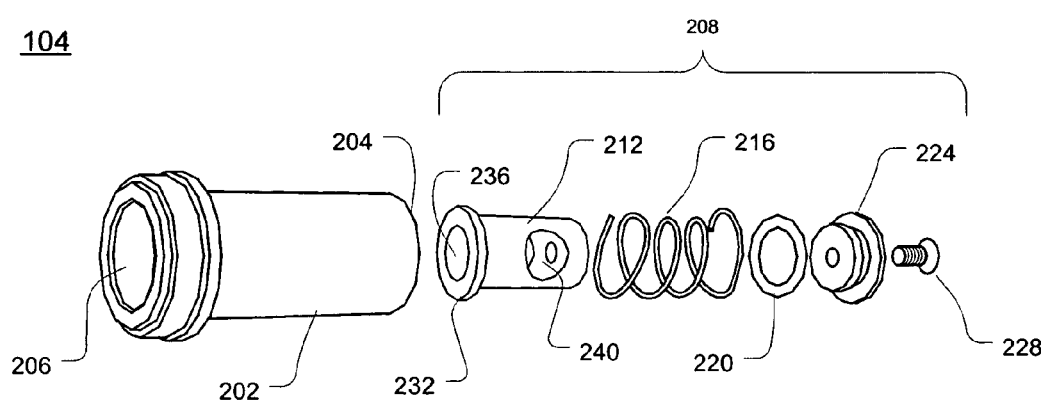
FIG. 2 illustrates an exploded perspective view of a connector, in accordance with an embodiment of the present invention.

FIG. 2 illustrates an exploded view of the connector 104 in accordance with an embodiment of the present invention. A connector body 202 may have an interior cavity with an upstream aperture 204 and a downstream aperture 206. The downstream aperture 206 may be adapted to receive a downstream regulator and the upstream aperture 204 may be adapted to receive an upstream regulator.

The terms "upstream" and "downstream" may be used to describe various attributes and relative motion of components of embodiments of this invention. In this context, the "stream," or general flow of water, may be in the direction from the plumbing conduit 108 out through the downstream aperture 206. However, these terms are used merely to facilitate the discussion of the illustrated embodiments, other embodiments may have other orientations consistent with the scope of this invention.

In one embodiment, the upstream regulator may be at least partially disposed within the interior cavity of the connector body 202. The upstream regulator may be functionally associated with the downstream regulator such that it either seals or unseals the upstream aperture 204 based at least in part on the absence or presence of the downstream regulator, respectively. With the upstream aperture 204 unsealed, e.g., in the presence of the downstream regulator, fluidic flow from the plumbing conduit 108 and out the downstream aperture 206 may be enabled.

In one embodiment, the upstream regulator may be a plunger assembly 208 that includes, for example, a plunger body 212, a spring 216, an O-ring 220, a sealing cap 224, and an assembly screw 228. The O-ring 220, which may be made of an elastomer or rubber material, may be placed in a groove on the sealing cap 224. The spring 216 may be positioned around the plunger body 212 and held in place by the sealing cap 224 and a flanged end 232 of the plunger body 212. The sealing cap 224 may be secured to the plunger body 212 with the assembly screw 228

The plunger body 212 may have an axial cavity 236 accessed to the exterior of the plunger body 212 via one or more through holes 240. The through hole(s) 240 and the axial cavity 236 may allow for the introduction of a fluid flowing from the plumbing conduit 108 to the interior cavity of the connector body 202, to be discussed later in further detail.

Figure 3:
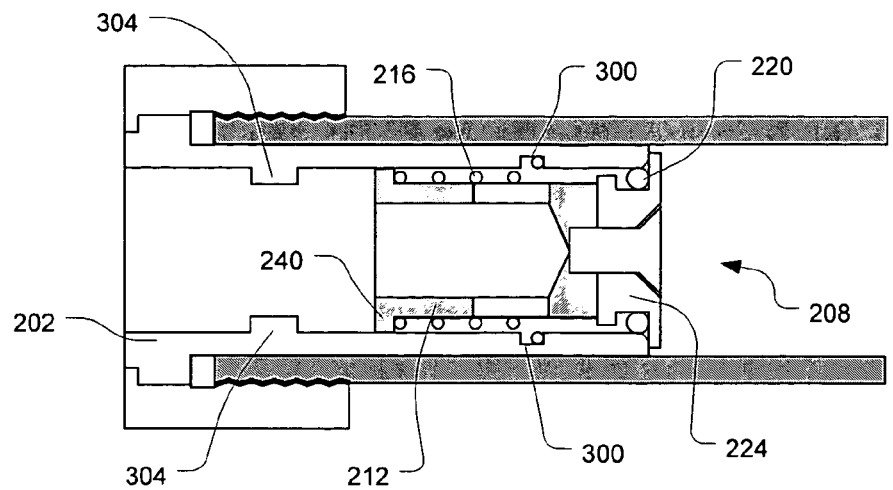
FIG. 3 illustrates a cross-sectional view of the assembled connection system, in accordance with an embodiment of the present invention.

FIG. 3 illustrates a cross-sectional view of the connection system 100 in accordance with an embodiment of the present invention. In one embodiment, the spring 216 may hold the plunger assembly 208 into the connector body 202 by having one end placed into a recess 300 in the connector body 202 interior wall. The spring 216 may have an outwardly tapered end in order to catch the recess 300. The spring 216 may be at least slightly compressed so that in the absence of a downstream regulator it may exert an axial force sufficient to cause the plunger assembly 208, and more specifically the sealing cap 224 and O-ring 220, to seal the upstream aperture 204 of the connector body 202.

In one embodiment, the connector body 202 may include a pair of retention pins 304 that may be used to couple the downstream regulator into the connection system 100.

Figure 4:
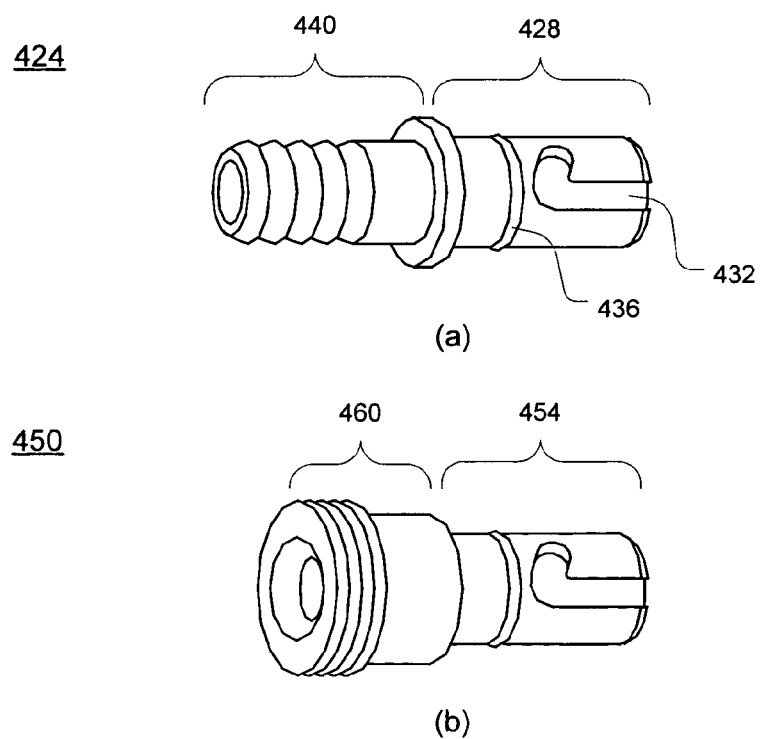
FIGS. 4(a)–(b) illustrate nozzles that may be used with the connection system, in accordance with embodiments of the present invention.

FIGS. 4(*a*)–(*b*) illustrate two regulators that may be suitable for coupling to the downstream aperture of the connection system 100 in accordance with embodiments of the present invention. More particularly, FIG. 4(*a*) illustrates a nozzle such as a barbed adapter 424. The barbed adapter 424 may have a modular coupling end 428 with a pair of patterned grooves 432 and an O-ring 436. The O-ring 436 may facilitate a seal between the interior cavity of the connector body 202 and the barbed adapter 424. The grooves 432 may be patterned so that the barbed adapter 424 may be inserted into the connection system 100 with the retention pins 304 in the grooves 432, rotated a predetermined distance (e.g., ¼ to ½ rotation), and released into a secured position. The barbed adapter 424 may then be uncoupled in a reverse manner. The coupling mechanism discussed with this embodiment may allow for quick coupling/uncoupling of the nozzles; however, other embodiments may use other suitable coupling mechanisms.

Figure 6:
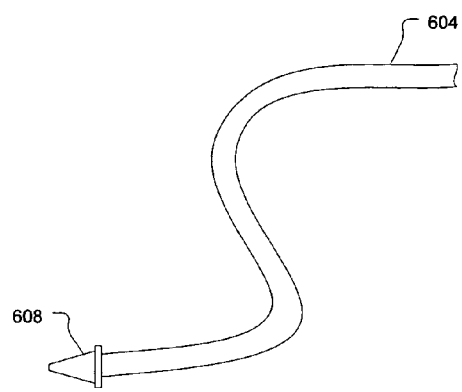
FIG. 6 illustrates a flexible conduit and flow device in accordance with an embodiment of the present invention.

The barbed adapter 424 may also have a barbed end 440 for attachment to a flexible conduit 604 illustrated in FIG. 6 in accordance with an embodiment of the present invention. The flexible conduit 604 may allow for tractable coupling to a flow devices 608, which may include, but is not limited to, a cleaning instrument to provide, e.g., a high-pressure jet stream and/or a hand shower. In various embodiments the flow device 608 may be any type of device that is capable of providing a discharge flow with a set of desirable flow characteristics.

FIG. 4(*b*) illustrates another type of nozzle that may suitable for coupling to the connection system 100 in accordance with an embodiment of the present invention. In this embodiment the nozzle may be a threaded adapter 450. Similar to the barbed adapter 424, the threaded adapter 450 may have a modular coupling end 454 suitable to be inserted into the connection system 100. The threaded adapter 450 may also include a threaded end 460 that may allow for more conventional attachment to flow devices such as, but not limited to, a spray tip and a shower head. In one embodiment, the threaded end 460 may have, for example, a male National Pipe Standard (NPS) thread. Other embodiments may include other types of attachment mechanisms including but not limited to female threads, dryseal threads, and tapered threads. In still other embodiments, nozzle adapters may include any of a variety of attachment mechanisms suitable to securely couple a flow device to the connector 104.

As shown, nozzles 424 and 450 may be adapters with a first end to be coupled to the connection system 100 and a second end to be coupled to a flow device. However, nozzles of other embodiments may be flow devices with integrated modular coupling ends for direct coupling to the connection system 100. This integration could thereby obviate the need for a separate intermediate adapter.

Figure 5:
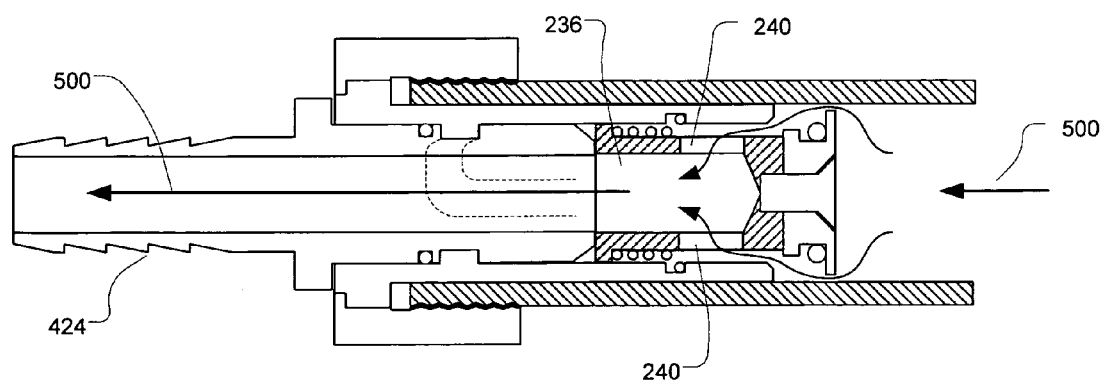
FIG. 5 illustrates an assembled cross-sectional view of the connection system with a nozzle inserted, in accordance with an embodiment of the present.

FIG. 5 illustrates a nozzle, for example the barbed adapter 424, secured in the connection system 100, in accordance with an embodiment of the present invention. In one embodiment, the plunger assembly 208 and the barbed adapter 424 may be functionally associated with one another. For example, the plunger assembly 208 may provide a downstream axial force that may facilitate the securement of the barbed adapter 424 against the retention pins 304. Conversely, the pressure from the barbed adapter 424 may cause the plunger assembly 208 to be moved upstream, or further into the plumbing conduit 108. This may, in turn, unseal the upstream aperture 204 thereby allowing for a fluid flow 500 to enter the interior cavity of the connector body 202. As briefly described above, the fluid flow 500 may enter the axial cavity 236 of the plunger assembly 208 through the through holes 240. This flow may then exit as a discharge flow through the barbed end 424 of the nozzle.

Thus, it can be seen from the above description that a novel inline connector that may provide quick and convenient coupling of flow regulators to a plumbing conduit has been described herein. While the present invention has been described in terms of the foregoing embodiments, a wide variety of alternate and/or equivalent implementations calculated to achieve the same purposes may be substituted for the embodiments shown and described without departing from the scope of the present invention. This application is intended to cover any adaptations or variations of the embodiments discussed herein. Therefore, it is manifestly intended that this invention be limited only by the claims and the equivalents thereof.

What is claimed is:

1. A connector comprising:
   a body, adapted to be coupled to a plumbing conduit, including
      an interior cavity,
      a first end having a first aperture and adapted to be disposed within the plumbing conduit coupled to the body; and
      a second end having a second aperture and an outer extent adapted to at least facilitate the coupling of the body to the plumbing conduit, the first and second apertures providing access to the interior cavity at the respective ends; and
   a first regulator at least partially disposed in the interior cavity, and adapted to seal and unseal the first aperture to prevent and enable fluidic flow from the first aperture to the second aperture, based at least in part on an absence and a presence of a second regulator at the second aperture, respectively.

2. The connector of claim 1, wherein a majority of the body is disposed within the plumbing conduit when the body is coupled to the plumbing conduit.

3. The connector of claim 2, wherein the second end includes a flange adapted to abut an outer rim of the plumbing conduit to at least facilitate the coupling of the body to the plumbing conduit.

4. The connector of claim 1, wherein the second regulator is a nozzle.

5. The connector of claim 1, wherein first regulator is adapted to facilitate securement of the second regulator at the second aperture.

6. The connector of claim 1, wherein the first regulator is a plunger assembly comprising:
a plunger body; and
a sealing cap, coupled to the plunger body, adapted to facilitate the sealing of the first aperture.

7. The connector of claim 6, wherein the plunger assembly further comprises:
an O-ring, positioned on the sealing cap, adapted to facilitate the sealing of the first aperture.

8. The connector of claim 6, wherein the plunger body includes:
an axial cavity; and
an exterior surface coupled to the axial cavity by a through hole.

9. The connector of claim 6, wherein the plunger assembly further comprises:
a spring adapted to provide an axial force upon the plunger assembly in a direction from the first aperture of the connector body to the second aperture of the connector body.

10. The apparatus of claim 1, further comprising:
a spring postitioned around the first regulator and adapted to engage a recess on an interior surface of the body.

11. The apparatus of claim 1 wherein the first regulator is a plunger assembly comprising:
a sealing cap adapted to facilitate the sealing of the first aperture.

12. A method comprising:
inserting a first end of a body of a connector into a plumbing conduit;
coupling the body of the connector to the plumbing conduit at a outer extent of a second end of the body; and
controlling fluidic flow from a first aperture at the first end to a second aperture at the second end through an interior cavity of the body with a first regulator disposed at the first aperature by inserting or removing a second regulator into or from the second aperture, respectively.

13. The method of claim 12, wherein said inserting or removing a second regulator comprises
inserting the second regulator into the second aperture until it engages the first regulator;
pressing the second regulator against the first regulator, and rotating the second regulator in a first direction to secure the second regulator to the connector.

14. A system comprising:
a flexible conduit having a first end and a second end;
a nozzle coupled to a first end of the flexible conduit; and
a connector, to couple to the nozzle, having
a body, adapted to be coupled to a plumbing fixture, including
an interior cavity,
a first end having a first aperture and adapted to be disposed within the plumbing fixture coupled to the body, and
a second end having a second aperture and an outer extent adapted to at least facilitate the coupling of the body to the plumbing fixture, the first and second apertures providing access to the interior cavity at the respective ends; and
a regulator at least partially disposed in the interior cavity, and adapted to seal and unseal the first aperture to prevent and enable fluidic flow from the first aperture to the second aperture, based at least in part on an absence and a presence of the nozzle at the second aperture, respectively.

15. The system of claim 14, wherein a majority of the body is disposed within the plumbing fixture when the body is coupled to the plumbing fixture.

16. The system of claim 14, wherein the second end includes a flange adapted to abut an outer rim of the plumbing fixture to at least facilitate the coupling of the body to the plumbing conduit.

17. The system of claim 16, further comprising:
a nut adapted to secure the connector to the plumbing fixture.

18. The system of claim 14, further comprising:
a flow device coupled to the second end of the flexible conduit and adapted to provide the fluidic flow with a set of flow characteristics.

19. The system of claim 18, wherein the flow device comprises a hand shower or a cleaning instrument.

20. The system of claim 14, wherein the regulator is a plunger assembly comprising:
a plunger body; and
a sealing cap, coupled to the plunger body, adapted to facilitate the sealing of the first aperture.

21. The system of claim 14, wherein the regulator is a plunger assembly comprising:
a sealing cap adapted to facilitate the sealing of the first aperture.

22. The system of claim 14, wherein the plumbing fixture is a shower pipe fixture or a faucet.

23. The system of claim 14, further comprising:
a spring postitioned around the regulator and adapted to engage a recess on an interior surface of the body.

* * * * *